UNITED STATES PATENT OFFICE.

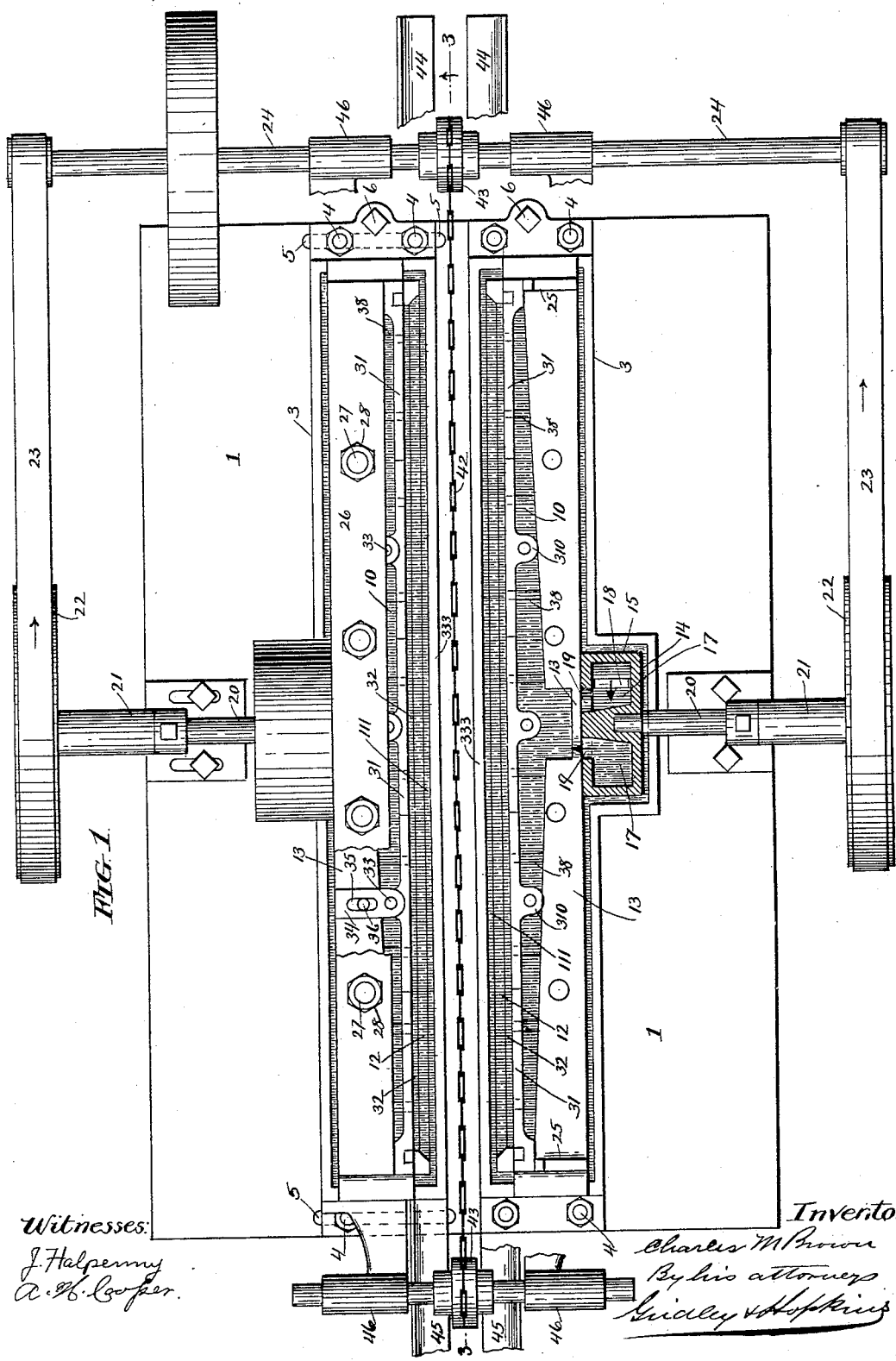

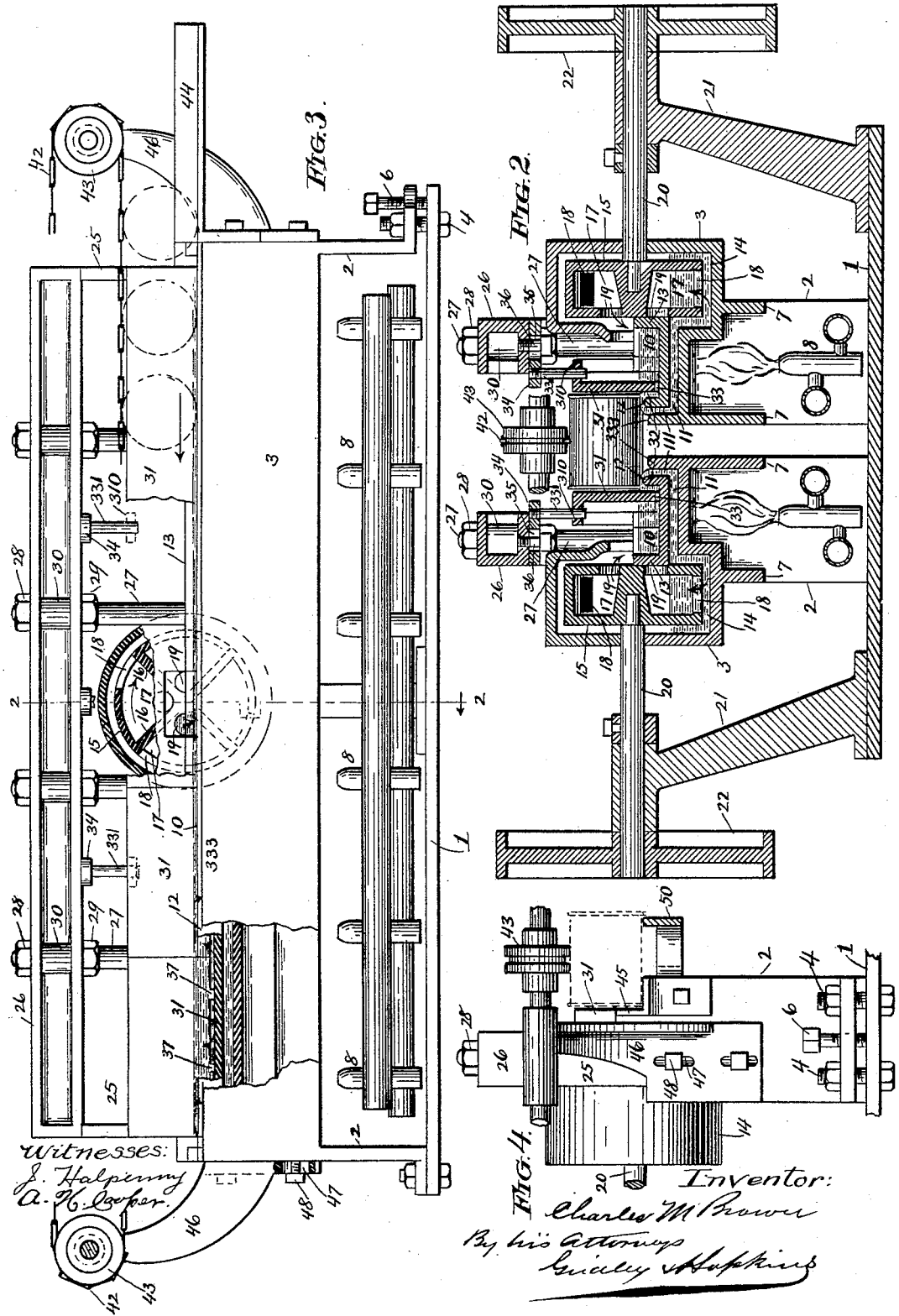

CHARLES M. BROWN, OF CHICAGO, ILLINOIS.

MACHINE FOR SOLDERING.

SPECIFICATION forming part of Letters Patent No. 522,778, dated July 10, 1894.

Application filed December 26, 1893. Serial No. 494,678. (No model.)

*To all whom it may concern:*

Be it known that I, CHARLES M. BROWN, a citizen of the United States, residing at Chicago, in the county of Cook and State of Illinois, have invented certain new and useful Improvements in Machines for Soldering, of which the following is a specification, reference being had to the accompanying drawings, which are made a part hereof, and in which—

Figure 1 is a plan view of a soldering machine embodying the invention. Fig. 2 is a vertical transverse section thereof on the line 2—2, Fig. 3. Fig. 3 is a vertical, longitudinal section thereof on the line 3—3, Fig. 1, and Fig. 4 is an end elevation of a portion thereof showing a slight modification.

The invention consists in certain features of novelty that are particularly pointed out in the claims hereinafter.

In Figs. 1 to 3 of the drawings I have shown a machine which is adapted to simultaneously solder the seams at both ends of the article, and in this machine the parts are all duplicated, one set of parts being arranged upon each side of the vertical plane indicated by the line 3—3 in the drawings. For the sake of simplicity this description will be confined to the parts upon only one side of this vertical plane, but similar parts on both sides are indicated by similar reference letters.

The machine is provided with a suitable base 1, from which rise a pair of standards 2, supporting a solder pan 3. The standards 2 are secured to the base by means of bolts 4, which pass through slots 5 formed through the base, so that said pan may be adjusted laterally, for a purpose that will appear presently. A set screw 6 is tapped through the foot of one of the standards and bears against the base, so that by adjusting said screw one end of the machine may be raised or lowered as occasion requires, in order to level it. Projecting downward from the bottom of the pan are flanges 7, the purpose of which is to confine beneath the pan as much as possible of the heat resulting from the combustion of gas or other fuel that is discharged from the burners 8.

10 is a second solder pan, which is supported by the pan 3 in such manner that between their bottoms is left a space 11, and between their walls is left a space 111, which spaces constitute a passage through which a current of solder is caused to flow continuously during the operation of the machine. In order to effect this continuous flow of solder the wall 12 of the upper pan is made lower than the wall 13, so that molten solder discharged into the pan 10 will flow over the wall 12 and through the passage.

In its broadest aspect the present invention is not limited to mechanism of any particular construction for discharging molten metal into the upper pan, but I prefer to employ the mechanism which is shown in the drawings because it is simple and is found to be very effective. It consists of a well or depression 14 located at the rear and middle of the lower pan, and a wheel 15 so arranged that it dips into said well, and so constructed that as it revolves it takes the solder from the well, elevates it and discharges it into the upper pan. This wheel is made of a drum having within it a number of radial partitions 16, resulting in a number of chambers 17, said drum being provided in its periphery with a number of openings 18 for the admission of the solder, and in one of its heads with a number of openings 19 for the discharge of the solder. The wheel is secured to a shaft 20 journaled in a suitable standard 21, and having a pulley 22 adapted to receive a belt 23, whereby it is driven from the main shaft 24 of the machine.

It will be seen that, even without other parts, the parts already described constitute a machine by which the seams of cans may be soldered, but in order to make the machine more complete I prefer to use in conjunction with the parts already described some or all of the parts hereinafter mentioned.

Rising from the ends of the pan 3 are standards 25, upon which rests a beam 26 located over the pan and extending from end to end thereof. Through this beam are a number of perforations through which pass freely bolts 27, whose lower ends are tapped into the pan 10, and whose upper ends are threaded for the reception of nuts 28, 29, located above and below the beam, respectively. It will be seen that by adjusting these nuts upward or downward, as may be necessary, either an upward or a downward strain may be applied to the pan 10, and the object of this is to correct the effect of the unequal heating and prevent the pan from bending either upward or downward, thereby maintaining the upper edge of the wall 12 as nearly as possible in a horizontal plane.

As shown in the drawings, the beam 26 is constructed of a piece of channel iron placed on edge, and in order to sustain its horizontal flanges and prevent their bending either upward or downward blocks 30 are interposed between them, said blocks being perforated for the passage of the bolts 27, whereby they are held in place.

The upper pan is provided with a false wall 31, which extends from a level above the top of the wall 12 downward to a level below the top of said wall, the arrangement being such as to leave a space 32 between the false wall and the wall 12, and a space 33 between the false wall and the bottom of the pan. The objects of this false wall are to prevent dross and other impurities which may be floating upon the surface of the solder from flowing over the wall 12, and to guide the articles as they pass through the machine. As shown, the false wall is made up of a number of plates, each of which is provided at its upper edge with a lug 310 perforated for the passage of a pin 331, the upper end of which is fixed to a plate 34 slotted at 35 for the passage of a bolt 36 whereby it is secured to the under side of the beam 26, the slot enabling the adjustment of the plate. In order to permit the false wall to rest upon the bottom of the pan, and at the same time provide for the space 33, each of the plates of which said wall is made up is provided with lugs 37, and lugs 38, formed on the bottom of the pan and engaging lugs 37, prevent the lateral inward displacement of the false wall.

In order to reduce to a minimum the quantity of solder in the upper pan 10, said pan is constructed with walls whose inner surfaces converge toward its ends, and in order to produce this convergence I prefer to make the rear wall 13 of a thickness which gradually decreases from the ends toward the middle. This completes the description of one of the two duplicate sets of parts of which the machine shown in Figs. 1 to 3, inclusive, is made up.

The front walls 12 of the upper pans constitute tracks upon which the can or other article to be soldered may be rolled from end to end of the machine. During its passage its seams come in contact with the solder flowing over said walls, so that when the can has made one complete revolution all portions of the seams will have been brought into contact with the solder and sealed. If the flange of the lid is placed inside of the body of the can, the seam may be sealed by rolling the can along the upper edges of the front walls 333 of the lower pan, so that the seam will come in contact with the current of solder at a point where it is flowing from a higher to a lower level.

Where but one end of the article is to be soldered, one half of the apparatus above described may be omitted, and in order to have a suitable support for the can the apparatus may be provided with a bar or rail 50 arranged parallel with the solder pan and at such height as to support the can in the required position, as shown in Fig. 4.

By making the two sides of the apparatus relatively adjustable toward and from each other provision is had for soldering cans of different lengths.

In order to facilitate the rolling of the cans from end to end of the machine, I prefer to use an endless belt or chain 42, which embraces suitably constructed pulleys 43, one of which is idle while the other is secured to the main shaft 24, whereby the said chain or belt is given a continuous movement in one direction. The pulleys are located at such height that the lower lap of the chain or belt comes in contact with the top side of the cans as they rest upon their supports, and thus the cans are rolled along. To enable the machine to receive cans of different diameters, the brackets 46 in which the pulley-supporting shafts are journaled are adjustable vertically. A simple way of accomplishing this is to provide the brackets with slots 47 and to secure them to the pans by bolts 48 passing through said slots.

In order to facilitate the feeding of the cans to the machine, I prefer to secure to its receiving end two parallel tracks 44, each of which forms an extension of one of the supports upon which the can rests in passing through the machine, and in order to receive the can at the delivery end of the machine I prefer to employ similarly constructed and arranged tracks 45, which may be of such length that before the cans leave them the solder will have had time to set. Said tracks are, preferably, formed of angle iron placed with one flange vertical, for preventing the can from rolling off at the side.

What I claim as new, and desire to secure by Letters Patent, is—

1. In a soldering machine, the combination of means for causing the molten solder to circulate in a continuous current which is partly exposed in order that the article to be soldered may be brought into contact therewith, and a support along which the article may be rolled to bring all portions of the seam successively into contact with the exposed portion of the current, the length of the support and exposed portion of the current being not less than the circumference of the article, substantially as set forth.

2. A soldering machine having, in combination, passages 32 and 111, means for causing the molten solder to circulate in a continuous current, flowing upward through one and downward through the other of said passages, and a support along which the article to be soldered may be rolled, said support being so located that the seam is brought into contact with the current of solder at a point between said passages, substantially as set forth.

3. A soldering machine having, in combination, means for causing the molten solder to circulate in a continuous current, a portion of said current being exposed, a support extending parallel with the exposed portion of the current, and along which the article may be rolled, and a guide extending parallel with the support, substantially as set forth.

4. In a soldering machine, the combination with a pan having sides and means for discharging molten solder thereinto, of a false side extending downward into the pan below the top of the side thereof and leaving a passage 32 between it and said side, substantially as set forth.

5. In a soldering machine, the combination with a pan and means for discharging molten solder thereinto, of a false side extending downward into the molten solder, said side being made up of a number of separate plates placed end to end, substantially as set forth.

6. In a soldering machine, the combination with a pan and means for discharging molten solder thereinto, of a false side made up of a number of separate plates placed end to end, and means for adjusting each of said plates, substantially as set forth.

7. In a soldering machine, the combination with a pan and means for discharging molten solder thereinto, of a false side made up of a number of separate plates placed end to end, studs engaging said plates, plates 34 supporting said studs, and a beam to which said plates 34 are adjustably secured, substantially as set forth.

8. In a soldering machine, the combination with a pan, of a beam extending lengthwise thereof, and means rigidly connecting the beam and pan and absolutely preventing the pan from bending either way independently of the beam, substantially as set forth.

9. In a soldering machine, the combination with a pan, of a beam extending lengthwise thereof, and adjustable bolts extending from the pan to the beam, and connecting them so that neither the pan nor the beam can move independently of the bolts, substantially as set forth.

10. In a soldering machine, the combination with a pan and the beam 26, of the bolts 27 tapped into the pan and passing through perforations of the beam, and nuts 28, 29, turned onto the bolts and engaging the top and bottom sides of the beam, respectively, substantially as set forth.

11. In a soldering machine, the combination of a pan, a beam extending lengthwise thereof, means rigidly connecting the beam and pan, preventing the pan from bending either upward or downward, and a support for the article carried by the pan, substantially as set forth.

12. In a soldering machine, the combination of two pans both having side walls and being placed one within the other so as to leave a passage between said side walls, and means for discharging molten solder into the inner pan until it flows over its side and into the said passage, substantially as set forth.

13. In a soldering machine, the combination of two pans both having side walls and being placed one within the other so as to leave a passage 111 between their walls, and means for taking the molten solder from the outer pan and discharging it into the inner pan so as to cause the solder to circulate in a continuous current, flowing over the wall of the inner pan and downward through the passage between the pans, substantially as set forth.

14. In a soldering machine, the combination of a pan and means for introducing molten solder thereinto, said pan having walls which converge from the point where the molten solder is introduced, substantially as set forth.

15. A soldering machine, having, in combination, a solder-bath having two exposed portions located opposite each other and in substantially the same horizontal plane, a support upon which the article is adapted to rest, said support being so located that the two seams at opposite ends of the article may be simultaneously presented to the exposed portions of the solder-bath, and means for constantly maintaining the surfaces of the exposed portions of the solder at a level above the level of the support, substantially as set forth.

16. A soldering machine, having, in combination, a solder-bath having two exposed portions located opposite each other and in substantially the same horizontal plane, a support upon which the article is adapted to rest and be rolled along, said support being so located that the two seams at opposite ends of the article may be simultaneously presented to the exposed portions of the solder-bath, and means for constantly maintaining the surfaces of the exposed portions of the solder bath at such a level that as the article rests upon the support the seams at its opposite ends both have contact therewith, the length of the exposed portions of the bath and of the support being not less than the circumference of the article, substantially as set forth.

17. A soldering machine having, in combination, means for causing molten solder to circulate in continuous currents having parallel exposed portions, said machine having also supports along which the article may be rolled, bringing each of its seams into contact with one of said currents, substantially as set forth.

18. A soldering machine having, in combination, two parts adjustable toward or from each other, each of said parts being provided with a bath of molten solder, a portion of which is exposed, the exposed portions of said baths being parallel, the machine having also a support along which the article may be rolled so as to bring each of two seams into contact with one of said baths of solder, substantially as set forth.

19. A soldering machine having, in combination, two parts adjustable toward or from each other, each of said parts having means for causing the molten solder to circulate in a continuous current, and each being adapted to expose a portion of its current of solder, the exposed portions of said currents being parallel, the machine having also a support along which the article may be rolled so as to bring each of two seams into contact with one of the currents of solder, substantially as set forth.

CHARLES M. BROWN.

Witnesses:
L. M. HOPKINS,
N. C. GRIDLEY.